United States Patent

Ackland et al.

[11] Patent Number: 6,150,922
[45] Date of Patent: Nov. 21, 2000

[54] SERIAL COMMUNICATION TECHNIQUE

[75] Inventors: Bryan David Ackland, Old Bridge; Per Magnusson, Hazlet, both of N.J.

[73] Assignee: Lucent Technologies Inc., Murray Hill, N.J.

[21] Appl. No.: 08/787,787

[22] Filed: Jan. 23, 1997

[51] Int. Cl.[7] ................................................ G08B 9/00
[52] U.S. Cl. ............................ 340/286.01; 340/310.01;
340/660; 340/310.05; 340/310.07; 375/257;
375/259; 370/278; 370/282
[58] Field of Search ................................ 340/660, 657,
340/654, 635, 641, 644, 538, 310.05, 310.01,
310.07, 278, 282; 375/259, 257

[56] References Cited

U.S. PATENT DOCUMENTS

| | | | |
|---|---|---|---|
| 4,217,572 | 8/1980 | Giraud | 235/80 |
| 4,272,758 | 6/1981 | Giraud | 235/80 |
| 4,639,936 | 1/1987 | Hogan et al. | 375/36 |
| 4,785,467 | 11/1988 | Yamada | 375/17 |
| 4,945,353 | 7/1990 | Jones | 340/825.07 |
| 5,317,597 | 5/1994 | Eisele | 375/36 |
| 5,398,025 | 3/1995 | Herman | 340/660 |

*Primary Examiner*—Daryl Pope
*Attorney, Agent, or Firm*—Eugene J. Rosenthal

[57] ABSTRACT

Information can be communicated back from a receiver to a transmitter over a serial link designed for communication to be essentially only in one direction without requiring a separate feedback path with an extra wire. This is achieved by changing at least one characteristic of the receiver input. For example, the receiver input impedance, the receiver input voltage, or both, may be altered. The change in a characteristic of the receiver input can be detected by an appropriately designed transmitter, and such detection can be used to trigger a change in the behavior of the transmitter. Advantageously, only simple alterations are required in conventional serial link circuits to provide a low bandwidth reverse communication path over the same wires. Such a change in a receiver input characteristic can also be employed to inform a transmitter of the existence of a receiver that is on a card that is hot-plugged into system.

6 Claims, 1 Drawing Sheet

SERIAL COMMUNICATION TECHNIQUE

TECHNICAL FIELD

This invention relates to the providing of reverse communication over a serial link designed substantially only for communication in one direction.

BACKGROUND OF THE INVENTION

Many systems employ serial communications. In certain applications the serial link is designed for communication to be essentially only in one direction. However, at startup, or in the event of an error condition, it may be necessary to communicate some information back from the receiver to the transmitter. Also, if a card containing a serial receiver is hot-plugged into a system, the receiver needs to inform the transmitter of its existence. Conventionally, to implement this type of reverse communication requires a separate feedback path with an extra wire. If such a serial link with reverse communication is implemented for communication between integrated circuits, disadvantageously, additional pins are required on each of the communicating integrated circuits.

SUMMARY OF THE INVENTION

In accordance with the principles of the invention, information can be communicated back from a receiver to a transmitter over a serial link designed for communication to be essentially only in one direction without requiring a separate feedback path with an extra wire. This is achieved by changing at least one characteristic of the receiver input. For example, the receiver input impedance, the receiver input voltage, or both, may be altered. The change in a characteristic of the receiver input can be detected by an appropriately designed transmitter, and such detection can be used to trigger a change in the behavior of the transmitter. Advantageously, only simple alterations are required in conventional serial link circuits to provide a low bandwidth reverse communication path over the same wires. Such a change in a receiver input characteristic can also be employed to inform a transmitter of the existence of a receiver that is on a card that is hot-plugged into system.

DETAILED DESCRIPTION

Figure 1:
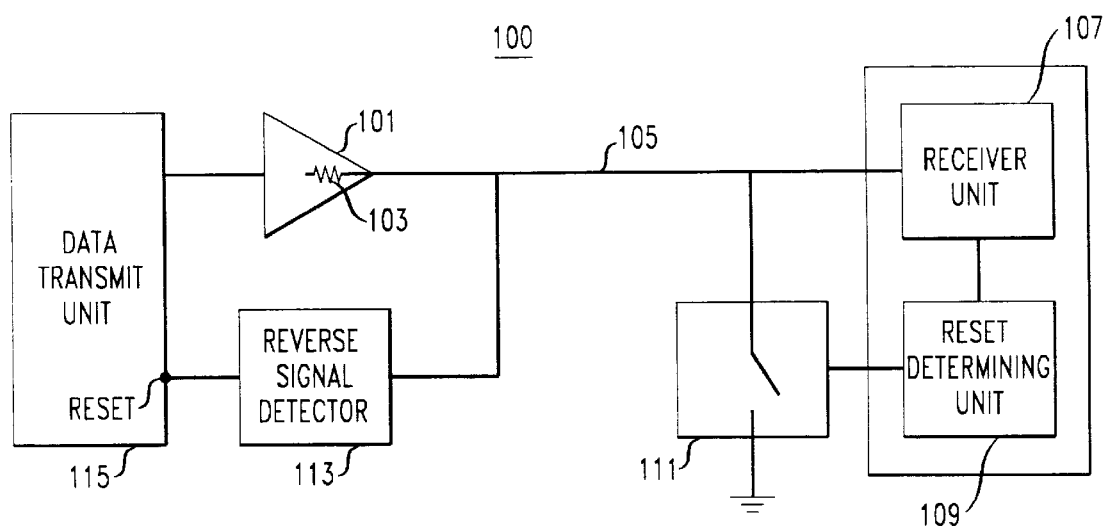
FIG. 1 shows an exemplary serial link arranged in accordance with the principles of the invention.

FIG. 1 shows exemplary serial link 100 arranged in accordance with the principles of the invention. The serial link of FIG. 1 includes transmitter line driver 101, serial line 105, receiver unit 107, reset determining unit 109, reverse signaling unit 111, reverse signal detector 113, and data transmit unit 115. Serial link 100 is designed for essentially unidirectional communication, specifically, only from transmitting line driver 101 to receiver unit 107. However, occasionally, a signal may be transmitted back from the receiver side of serial link 100 to the transmitter side of serial link 100 in accordance with the principles of the invention.

Operation of the serial link of FIG. 1 is as follows. Data transmit unit 115 supplies data to transmitter line driver 101 for transmission to the receiver side. Transmitter line driver 101 converts the bits received from data transmit unit 115 to line voltages. Transmitter line driver 101 has output impedance 103, e.g., 50 ohms, to provide protection of transmitter line driver 101 and to provide impedance matching for the termination of serial line 105.

Data transmitted via serial line 105 is received at receiver unit 107, where, under most circumstances the data is extracted and the clock is recovered. Transmitter line driver 101, output impedance 103, serial line 105, receiver unit 107 and data transmit unit 115 are known in the art.

In accordance with the principles of the invention, when a predefined condition, such as a) an error occurring in transmission, e.g., loss of synchronization, or b) when the receiver is hot-plugged into a system, this is detected by, or signaled to, reset determining unit 109. In response, reset determining unit 109 signals reverse signaling unit 111 to send a signal back to the transmitter by changing at least one characteristic of the receiver input, in accordance with the invention. For example, the receiver input impedance, the receiver input voltage, or both, may be altered. Reset determining unit 109 may also signal receiver unit 107 to change its operating mode in anticipation of data transmit unit 115 changing its operating mode as its response to receiving the reverse signal.

In the exemplary embodiment of FIG. 1, when signaled to do so by reset determining unit 109, reverse signaling unit 111 shorts serial line 105 to ground, thus changing both the input impedance and the input voltage. This change is detected by reverse signal detector 113, and an indication of such detection is supplied to data transmit unit 115. For example, the indication may be supplied as a reset signal to data transmit unit 115, which causes data transmit unit 115 to reinitialize itself, and, optionally, to execute a startup sequence to initialize serial link 100.

Reverse signal detector 113 may be, for example, a Schmitt trigger. In another embodiment of the invention, a comparator may be employed. Alternatively, reverse signal detector 113 may also be arranged to detect reflections back from transmission line 105, so as to detect a change in impedance caused by reverse signaling unit 111.

The techniques of the invention may be employed for single ended or for differential serial links.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. Apparatus for use in serial communication, comprising, a transmitter line driver having a finite output impedance and adapted for coupling to a serial communications line; and a detector for detecting a change of at least one characteristic at a remote end of said communications line, wherein said transmitter line driver is part of a transmitter unit and further including reset circuitry for resetting said transmitter unit in response to said detector detecting said change, said reset circuitry being operable independent of any clock of which an indication is transmitted by said transmitter line driver.

2. The invention as defined in claim 1 wherein said at least one characteristic is a voltage of said communications line.

3. The invention as defined in claim 1 wherein said at least one characteristic is the impedance at the remote end of said communications line.

4. The invention as defined in claim 1 wherein at least one characteristic includes both the impedance at the remote end of said communications line and a voltage of said communications line.

5. The invention as defined in claim 1 wherein said detector detects said change by sensing changes in the voltage on said communications line.

6. Apparatus for use in serial communication, comprising, a transmitter line driver having a finite output impedance and adapted for coupling to a serial communications line; and a detector for detecting a change of at least one characteristic at a remote end of said communications line, wherein said detector detects said change by sensing reflections on said communications line.

* * * * *